United States Patent [19]

O'Hare

[11] 4,253,801

[45] Mar. 3, 1981

[54] CONVECTION CURRENT PUMPING CALLED, SERIES CONVECTION PUMP

[76] Inventor: Louis R. O'Hare, 1041 Ponderosa #2, Fort Collins, Colo. 80521

[21] Appl. No.: 805,005

[22] Filed: Jun. 9, 1977

[51] Int. Cl.³ .............................................. F04B 19/24
[52] U.S. Cl. ......................................... 417/52; 165/45
[58] Field of Search .................. 417/52, 207; 165/485, 165/45

[56] References Cited

U.S. PATENT DOCUMENTS

| | | | |
|---|---|---|---|
| 1,063,636 | 6/1913 | Barbezat | 417/207 |
| 3,098,602 | 7/1963 | Torluemke | 417/207 X |
| 3,565,551 | 2/1971 | Hobson | 417/207 |
| 3,981,627 | 9/1976 | Kantor | 417/207 |
| 4,059,126 | 11/1977 | Nickerson | 417/52 X |

*Primary Examiner*—Albert W. Davis
*Assistant Examiner*—Margaret A. Focarino

[57] ABSTRACT

An array of several convection tubes are positioned in a series configuration to provide the equivalent of a very tall convection current generating tower, the pressure and fluid flow of the array thereby becoming capable of significant pressures such as the pressures necessary to move solar heated air into the confines of a rock storage area, the pressure increases of this array being achieved by the additive effects of connecting heated and cooled convecting columns together alternately in such a way that the output of one is connected to the input of another.

6 Claims, 7 Drawing Figures

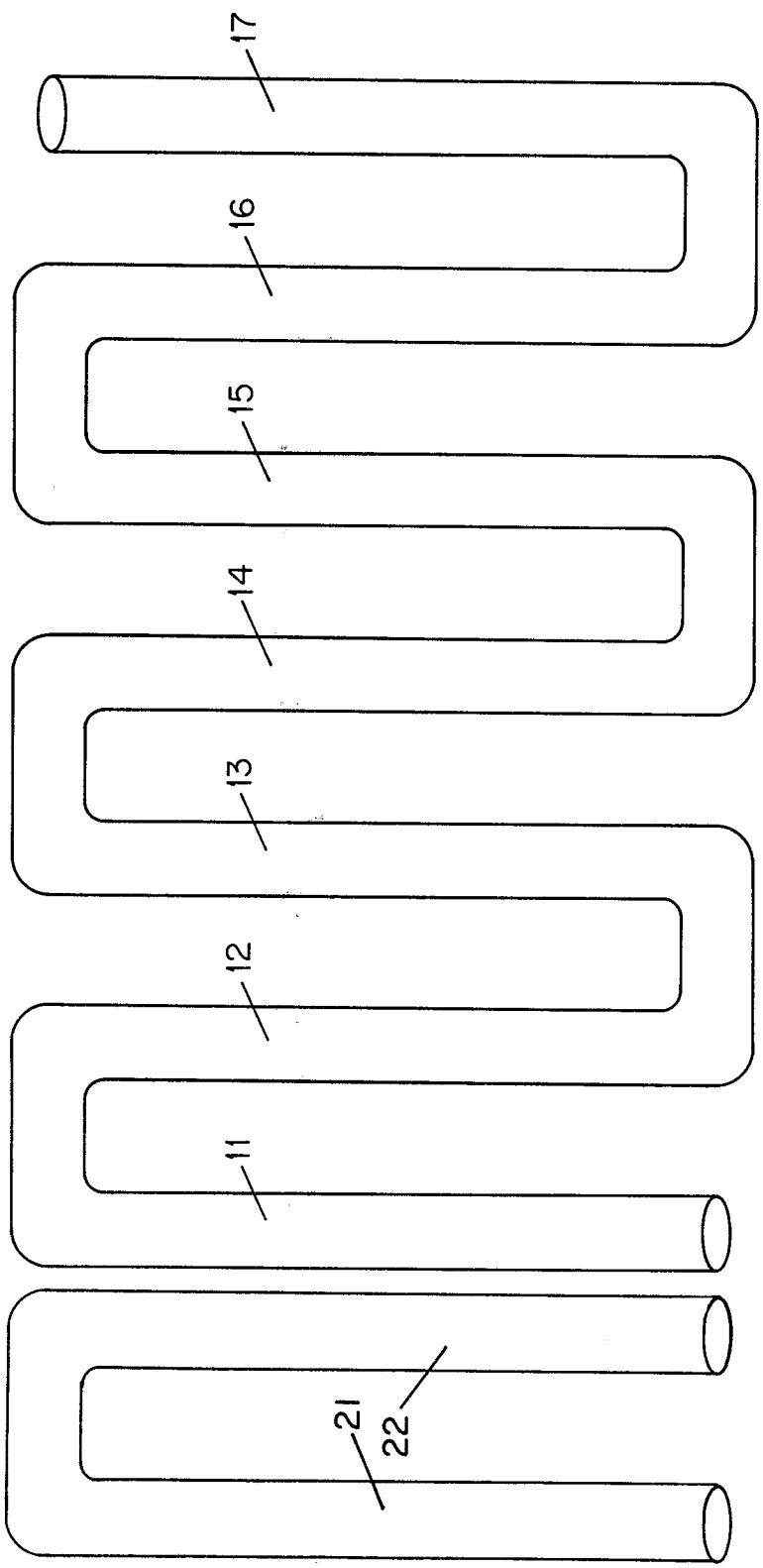

CONVECTION CURRENT PUMPING CALLED, SERIES CONVECTION PUMP

This invention relates to the art of moving fluids i.e. gas or liquid by means of convection. It refers to the heating and/or cooling of certain quantities or volumes of gas to produce a temperature differential between that volume and the ambeint temperature of the surrounding fluid in order that a heated and expanded volume will rise relative to the surrounding gas and in order that a cooled quantity of gas will fall relative to the surrounding gas. This art is familiar in the use of the smoke stack in which the rising heated gases and vapors ascend because of their reduced weight and by ascending draw useful oxygen-rich combustion air into the firebed of a furnace. The rising due to a density decrease caused by heating or the descending due to a density increase is familiar in liquids as well as in gases and as an example of the art of moving a fluid for a useful purpose by means of a convection reference can be made to the currents in a boiler in which a rising heated column draws cooler water into the hotest area for heating.

This present invention, however, differs from the prior art not in that it is a novel application of a well known and well used mechanism but in that it comprises an innovative adaptation of the convection principle in order to make the application much more effective. Specifically, my present invention utilizes multiple convection fluid movers aligned in a series configuration in order to produce an additive effect on the pressure and velocity of the moving fluid and it employs these required pressure and velocity elevations for the movement of heating and cooling fluids to produce a more effective passive solar heating and cooling system. In short my present invention is a multiple stage convection pump which adds the pressures of multiple convection columns in order to produce a final pressure on the circulating fluid which is truely adequate to move the fluid through solar storage systems, such as rock piles or tanks, and through areas from or to which heat must be pumped. This invention is described in my Disclosure Document No. 053274 of Oct. 12, 1976.

To understand the present method an analagous but in some respects less satisfactory system might first be contemplated. Since present passive solar energy collection and distribution systems require no external energy input for air or fluid movement but rely on convection to move the heat transfer fluid to various areas and through storage there is a certain reluctance to use a purely passive system without designing an entire instalation able to operate on a very low pressure differential. This is because the fluid pressure produced by the single column formed by the height of the solar collector or by the single column formed by the height of the storage area and heated area is very low and this pressure is able to move the heating or cooling fluid in adequate quantity only when conducting ducts are very large and the impedance to flow through storage is very low. To reduce the size requirement on the fluid ducting and to reduce the size as well as to reduce the low flow-impedance requirement through storage of the conventional passive solar system, use could be made of a very high heated tower. A high tower like a very tall smoke stack could produce a proportionately higher pressure differential to move the heat transferring fluid. Such a convection tower while obtruding on aesthetic sensibilities would provide pressure and movement advantages over present passive systems.

Since passive systems for solar heating can be designed large enough to be "energy free", in an energy depleted world a truely suitable convection pump would have great merit for saving energy presently required in solar energy circulation. The high convecting tower is one such pump which can make the passive solar system more practicable by adding advantageous pressures to the passive system.

However, there is a way in which the advantages of a high pressure convecting system may be had without the aesthetically offensive and physically difficult requirement of constructing a tower. This present invention then particularly specifies several shorter towers or convecting columns so arranged in a series configuration and interconnected that the pressure differential developed across each adds to provide a total pressure which is the sum of the pressures developed across each column. This obviously cannot be done by alternately connecting the top of each heated column to the bottom of each succeeding heated column as there would be heated fluid in the inter connecting lines. Each pair formed of one inter connecting line and one column would actually and effectively equal two heated columns adjacent to each other and their pressures would oppose each other producing a net pressure differential of zero across the two connected together. However, when alternate heated and cooled columns are connected in such a manner that the top of a cooled column connects to the top of a heated column and the bottom of that cooled column connects to the bottom of the next heated column and that same next heated column at its top connects to the succeeding cooled column and so on, then the pressure differential across each column both hot and cold adds to the total pressure differential of the series. In this way several inter connected short columns can produce the same pressure differential as one very high single column. The single high column would work whether it were heated above ambient or cooled below ambient. It would create a pressure differential in either case, only the direction of the differential would change. A tall column of cold air would of course have its highest pressure at its lowest end.

In the series convection pump just described, when the alternate heated columns are above ambient and the alternate cooled columns are only near ambient temperatures then the cooled columns contribute little to the total pressure differential of the system but the pressure differentials of the heated columns still remain additive to the system. Similarly, when the alternate cooled columns are below ambient surrounding temperatures and the heated columns are near ambient then the heated columns contribute little to the total pressure differential of the system while the pressure differentials of the cooled columns are additive.

Just as a tower type of convection air pump might be placed into a solar heating or cooling system to substitute for an electrically driven air blower so also the series convection air pump is placed in any standard or retrofit solar system in the same relative place in the air circuit as the conventional air mover is placed. Again the series convection air pump substitutes as an "energy free" source of air movement to provide a passive solar system.

As the embodiment of the basic inventive concept embraces fluids generally, it is clear that configuration of hot and cold series convecting columns may be employed to solar hydronic systems to provide a convecting liquid pump moving heat transferring liquids to storage, to collectors and to living areas etc.

Clarification of mechanisms and embodiments is given in referring to the drawings.

FIG. 1 of the drawings depicts a single heated tower producing a convective flow to move air through a storage system and to heat a house.

FIG. 2 of the drawings shows a series convection of heated convection columns which does not produce much addition of the pressures of the columns.

FIG. 3 shows an individual link form a series chain in which there is now pressure differential developed.

Figure 1:
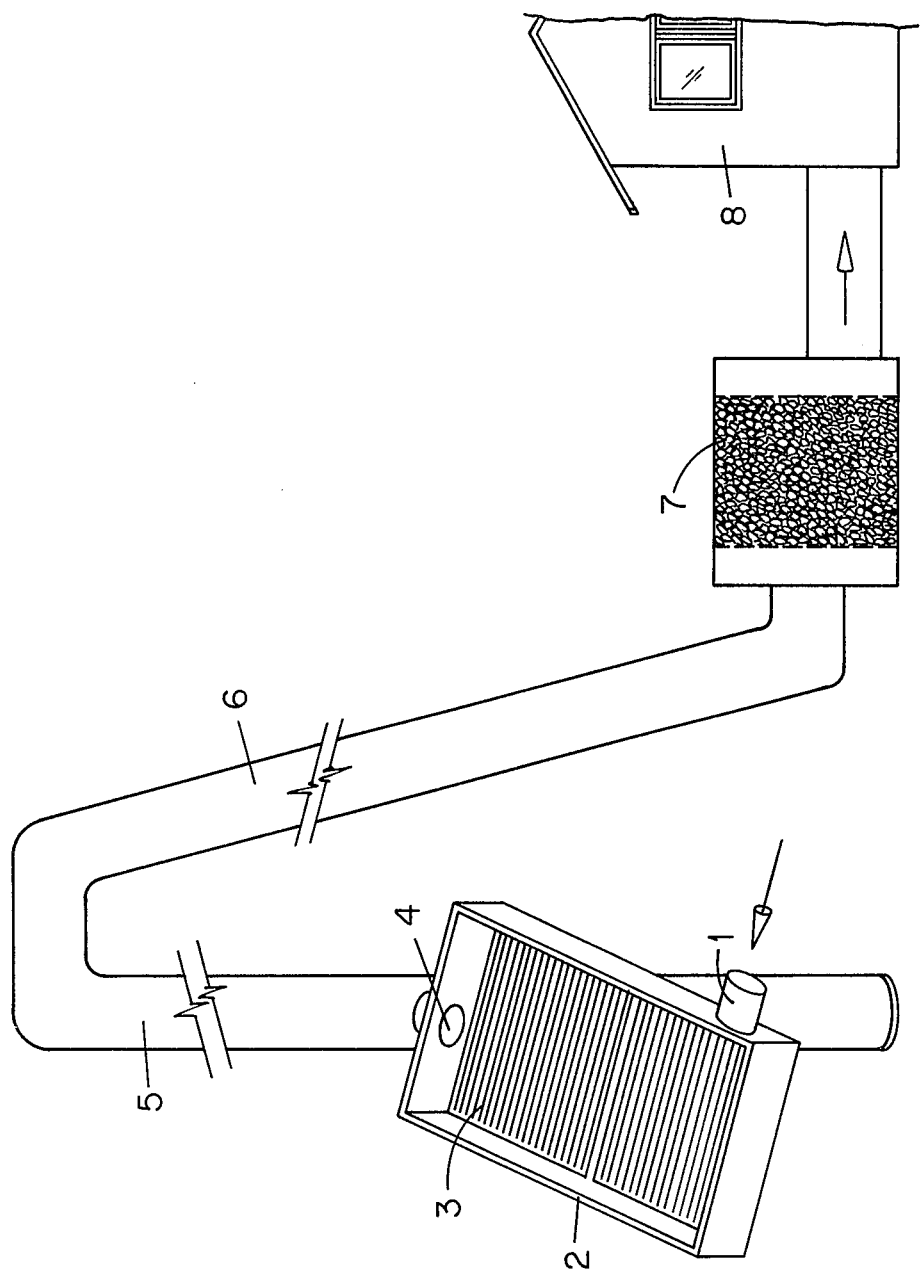

Referring then to FIG. 1 of the drawings, duct 1 receives cooler air into solar collecting box 2 in which light energy entering through front surface glass plate, not shown, strikes black absorber plate 3 on which radiant energy is absorbed and converted to heat thereby heating air admitted through 1 and causing expanded air to rise through duct 4 into tall insulated column 5 thereby heating column 5 and providing a high heated column in which a large convection current and pressure can develope to move heated column of air to descending column 6 in which airstream is slightly cooled. The convection pressure from column 5 is variable depending upon how high the temperature is over ambient and depending as well upon the height of the column and the cooling produced in descending column 6. However, pressures here are adequate to move the heated air through storage area 7 and through living area 8. In turn air entering 1 may be received from living area 8 or from cool side of storage area 7 or from out door ambient by means of suitable valving and ducting as is practiced in the present state of the art which valving and ducting is not shown here.

Referring now to FIG. 2 of the drawings which is used merely to illustrate an unsatisfactory juxtaposition of columns in which very little convection and pressure differential is produced. In arm 11 a column of fluid such as air is heated when the arm is heated. The column of air, or for that matter any fluid, rises and descends in arm 12 descending rapidly at first as it cools and gains weight then more slowly when 2 is heated and no longer able to cool the fluid moving through it. Externally heated arm 13 similarly heats and reduces the density of the fluid within it but when the heated fluid of 13 reaches 14 and heats it then the fluid in 14 is no longer much heavier than the fluid in 13 and the fluid in both 13 and 14 both tend to rise nearly equally and fluid flow from 13 to 14 is effectively curtailed. In the same way if 15 is heated externally fluid convecting from it to 16 will eventually cease for the same reason. Some fluid could rise from arm 17 if it were externally heated, but FIG. 2 merely illustrates an ineffective attempt to produce a series of convecting columns.

Referring to FIG. 3 of the drawings arms 21 and 22 are used to emphasize that when the temperatures in any two succeeding arms are the same, convection will cease but if 20 is heated and 22 is externally cooled fluid will flow between the two. Similarly if 22 is heated and 21 cooled there will be a heated flow.

Figure 4:
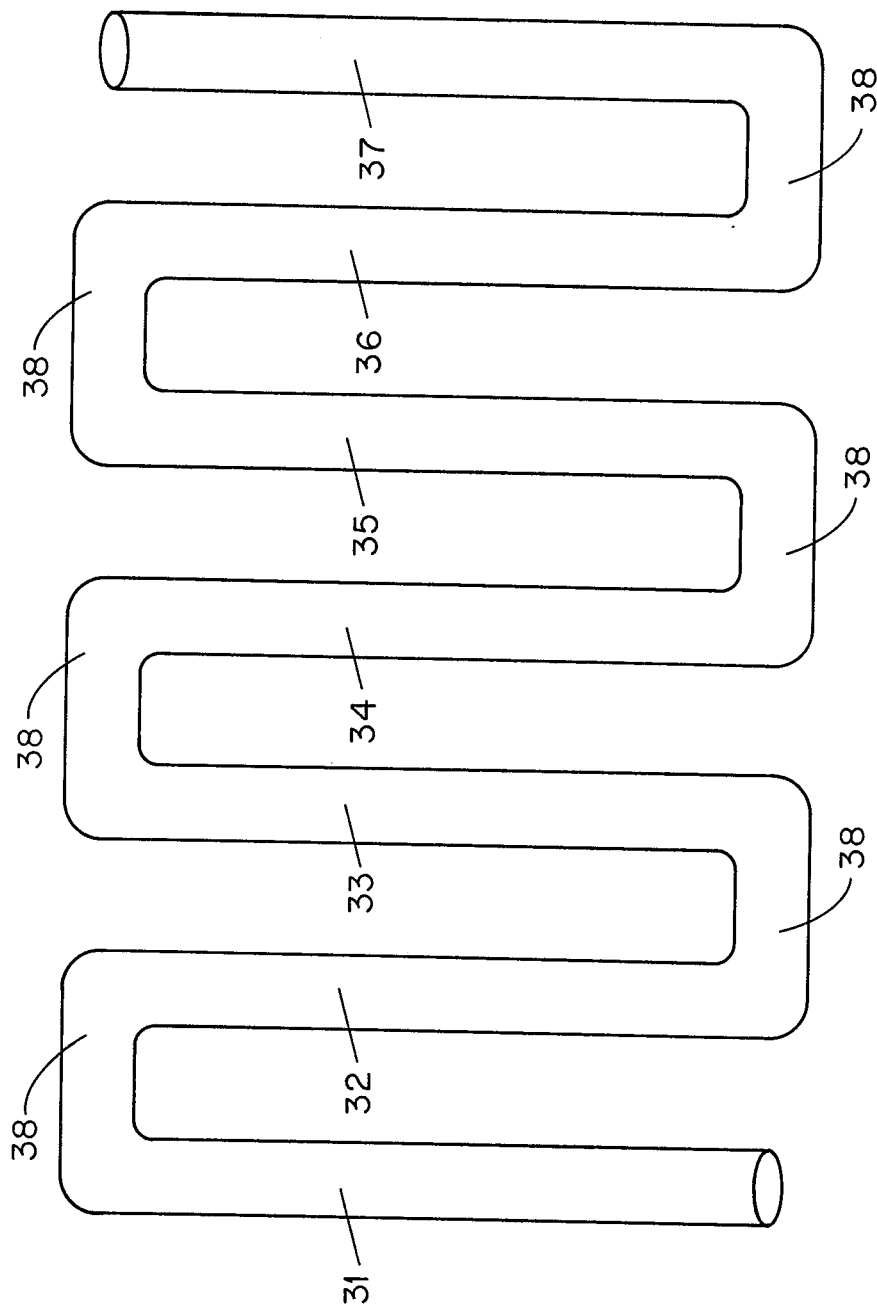
FIG. 4 shows a true series additive hot-cold convection fluid pump.

Referring now to FIG. 4 when arms or tubes 31, 33, 35, and 37 are heated to continually heat the fluid within them a column of fluid will have a reduced density and a convection pressure tending to cause the fluid to rise when 32, 34, and 36 are cooled relative to the temperatures of the heated tubes then the relatively higher density will cause the fluid to fall in these tubes or arms. The alternate upward and downward movements and pressures are additive to produce a flow from 31 to 37. The process and the flow is reversible by keeping 31, 33, 35 and 37 cool and heating 32, 34, and 36. Connecting means 38 joins alternate hot and cold convection columns. Heating tubes 31, 33, 35, 37, as well as cooling tubes 32, 34, and 36 may be any type of sealed cavity such as elongated rectangular boxes, cylinders, hollow columns, sealed sections of a plenum etc. In the case of heating tubes 31, 33, 35, 37 these need not be actually tubular in shape but may be verticle or inclined sealed sections of a solar collector panel.

Figure 5:
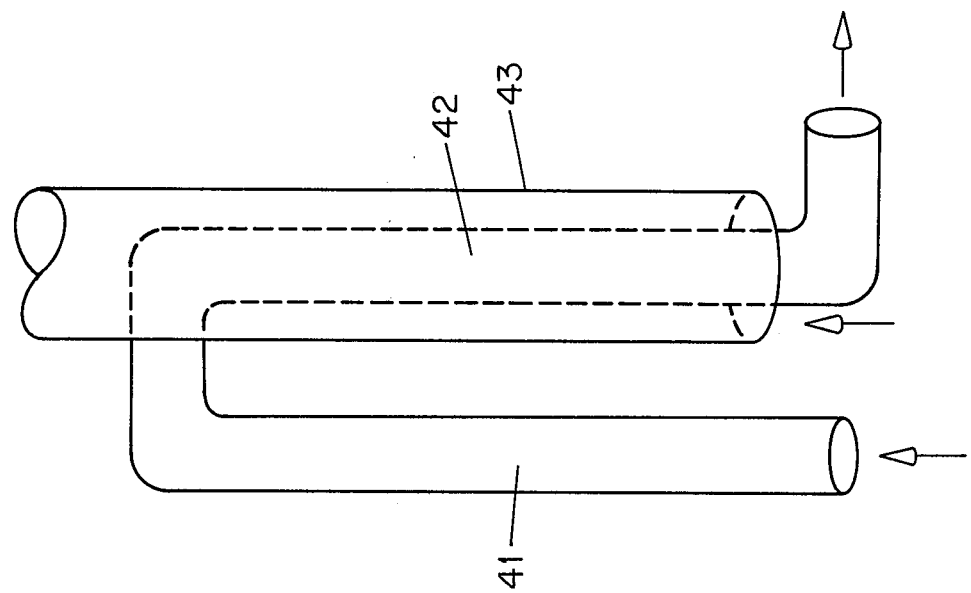
FIG. 5 shows one method of cooling a cooled column using a cooling convection sleeve around the cooled columns.

In FIG. 5 of the drawings heating tube or arm 41 causes fluid to flow to descending tube or arm 42 thereby heating 42 and heating fluid in cavity between tubes 42 and 43 causing the fluid in the cavity between 42 and 43 to rise thereby cooling tube 42 and its contents and assisting downward convection within 42. In other embodiments radiators and cooling fins are used to cool 42.

Figure 6:
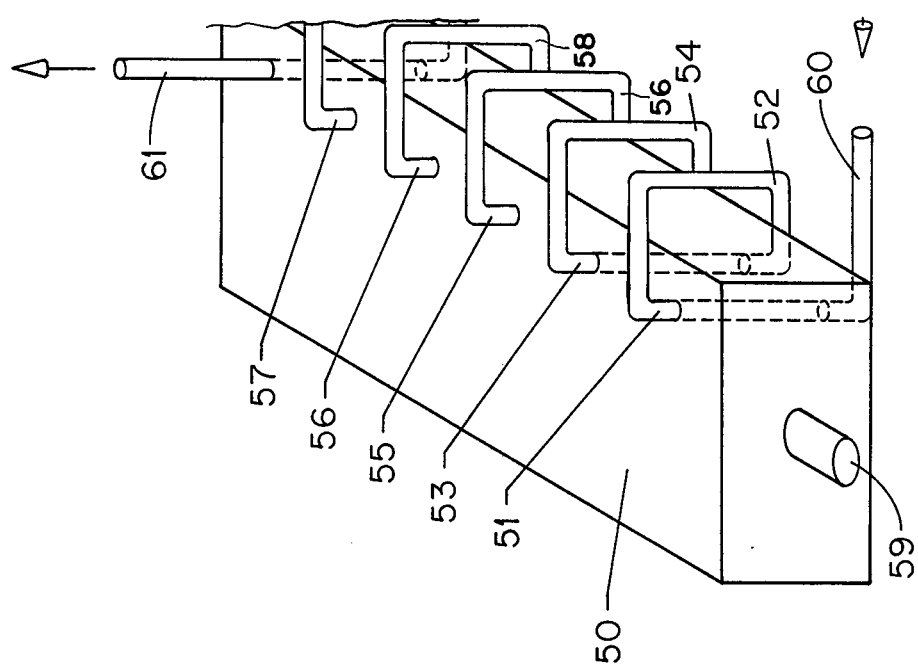
FIG. 6 shows a series convection pump in which the alternate heated arms are heated by a hot solar energy storage unit and the cooled arms are cooled by the ambient surrounding air.

In FIG. 6 a typical solar heat storage area 50 is used to heat the alternate heated arms or tubes 51, 53, 55, 56, 57, 58 which alternate with cooled tubes 52, 54, 56, 58, and 60 and are connected to them as 31, 33, 35 and 37 are connected to 34, 32, and 36 of FIG. 4. That is to say they are connected in a series configuration providing a single flow-through passage. Cooled elements in one embodiment each have a convecting, cooling shroud as shroud 43 in FIG. 5 or they may have fins or other radiators. Outlet duct 58, according to a principal embodiment, exits moving fluid under pressure to the inlet port of a solar collector (not shown) and heated fluid from the collector is admitted to storage heating inlet port 59. The total effect of the action between inlet 60 and outlet 58 is simply to move fluid under pressure and it may be used in any situation where heating and/or cooling are available as where geothermal heat is available adjacent to a cooling body of water or glacial ice. The principal embodiment, however, involves its use in moving heat transfer fluids in solar energy applications. In one embodiment therefore the alternating heated tubes are heated directly by the solar panels as the tubes are placed inside of the panels or physically connected to them and the alternate cooling tubes are cooled behind or aside of the solar collecting panels. In still another embodiment the heating of the heating tubes is done by both the solar collecting panals and by storage area heat. The cooling for the alternate cooling tubes is accomplished adjacent to the separate heating areas as described above.

I claim:

1. A passive solar energy operated system comprising:
   a multiple convection current production means comprising an array of several elongated cavities forming convection columns said convecting columns being of a twofold variety the one type producing convection fluid movement by means of heating and the other producing convecting fluid movement by means of cooling and an alternate tube connection means coupling the output fluid of a heating covection tube to the input duct of a cooling convection tube and connecting the output end of a cooling convection column to the input of yet another subsequent heating tube and so on providing a series of connected alternate heating and cooling convection tubes so interconnected that the convection action of each tube adds to the convective flow produced by the others and, convection tube heating providing a temperature rise for the alternate tubes that produce convection current by heating and, convection tube cooling means providing a temperature decline for those alternate tubes causing convection current by cooling wherein the convection tube heating means is a solar collector.

2. A pump as in claim 1 in which the heating means is a solar energy storage unit into which the heating convection tubes have been placed.

3. A pump as in claim 1 in which the convection tubes or cavities are cylinders placed into solar energy absorbtion collectors.

4. An air or fluid pump as in claim 1 in which the heating convection cavities are sealed segments of a solar energy collector.

5. A pump as in claim 1 in which the cooling of the cool convection tubes is accomplished by a cooling jacket wherein the convection in the jacket produces a circulation which cools the cool convection tube.

6. A passive solar energy operated system comprising: a multiple convection current production means comprising an array of several elongated cavities forming convection columns said convecting columns being of a twofold variety the one type producing convection fluid movement by means of heating and the other producing convection fluid movement by means of cooling and an alternate tube connection means coupling the output fluid of a heating convection tube to the input duct of a cooling convection tube and connecting the output end of a cooling convection column to the input of yet another subsequent heating tube and so on providing a series of connected alternate heating and cooling convection tubes so interconnected that the convection action of each tube adds to the convective flow produced by the others and, convection tube heating means providing a temperature rise for the alternate tubes that produce convection current by heating and, convection tube cooling means providing a temperature decline for those alternate tubes causing convection current by cooling, wherein the convection tube heating is provided by geothermal heat.

* * * * *